United States Patent
Chen et al.

(10) Patent No.: US 11,672,060 B1
(45) Date of Patent: Jun. 6, 2023

(54) LED DRIVING CIRCUIT, LED DRIVING METHOD AND DISPLAY DEVICE APPLYING THE SAME

(71) Applicant: Qisda Corporation, Taoyuan (TW)

(72) Inventors: Chi-Jen Chen, Taoyuan (TW); Chih-Hsiang Wu, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/709,541

(22) Filed: Mar. 31, 2022

(30) Foreign Application Priority Data

Jan. 13, 2022 (CN) .......................... 202210035716.X

(51) Int. Cl.
  *H05B 45/345* (2020.01)
  *H05B 45/325* (2020.01)
  *H05B 45/20* (2020.01)

(52) U.S. Cl.
  CPC ........... *H05B 45/325* (2020.01); *H05B 45/20* (2020.01); *H05B 45/345* (2020.01)

(58) Field of Classification Search
  CPC ...... H05B 45/20; H05B 45/30; H05B 45/325; H05B 45/345; H05B 47/10
  See application file for complete search history.

(56) References Cited

U.S. PATENT DOCUMENTS

2019/0191507 A1*  6/2019  Wang ................... H05B 45/345

* cited by examiner

*Primary Examiner* — Jimmy T Vu

(57) ABSTRACT

A light emit diode (LED) driving circuit, an LED driving method and a display device thereof are provided. The LED driving circuit includes: a first LED driving unit for driving first and second color LEDs of the LED circuit. The first LED driving unit includes: a duty cycle circuit generating an enable signal based on at least two color light duty cycle signals, the at least two color light duty cycle signals controlling an emitting cycle of the LED circuit; a current control circuit, generating at least two color light current adjustment signals based the at least two color light duty cycle signals and at least two color light current level signals; and a constant current circuit, for adjusting current levels of the first and the second color LEDs of the LED circuit based on the enable signal and the at least two color light current adjustment signals.

20 Claims, 5 Drawing Sheets

LED DRIVING CIRCUIT, LED DRIVING METHOD AND DISPLAY DEVICE APPLYING THE SAME

This application claims the benefit of People's Republic of China application Serial No. 202210035716.X, filed Jan. 13, 2022, the subject matter of which is incorporated herein by reference.

TECHNICAL FIELD

The disclosure relates in general to a light emit diode (LED) driving circuit, an LED driving method and a display device applying the same.

BACKGROUND

LED display device (for example but not limited by, LED projector) has a lot of usage, for example but not limited by, meeting presentation, viewing videos at home etc. Now, the LED display devices have three kinds of light sources, i.e. bulbs, light emit diodes and laser. The three kinds of light sources have their advantages and disadvantages, and thus are applied in different areas.

The bulb light source provides high brightness and low cost, but short life cycle, easily-degraded brightness and color saturation. The LED light source has advantages of low power consumption, low heat radiation and long life cycle. The laser light source has high brightness and long life cycle.

The LED display device needs three LED driving circuits for driving three colors R/G/B LED strings, and thus the inner space of the LED display device is highly occupied and also the circuit cost is high.

Thus, there is an effort to develop a low cost LED driving circuit, a LED driving method and an LED display device, which occupies less inner space of the LED display device.

SUMMARY

According to one embodiment, an LED driving circuit is provided. The LED driving circuit is coupled and drives an LED circuit. The LED driving circuit includes: a first LED driving unit, being coupled and driving a first color LED and a second color LED of the LED circuit. The first LED driving unit includes: a duty cycle circuit generating an enable signal based on at least two color light duty cycle signals, the at least two color light duty cycle signals controlling an emitting cycle of the LED circuit; a current control circuit, generating at least two color light current adjustment signals based the at least two color light duty cycle signals and at least two color light current level signals; and a constant current circuit, coupled to the duty cycle circuit and the current control circuit, the constant current circuit adjusting current levels of the first and the second color LED of the LED circuit based on the enable signal and the at least two color light current adjustment signals, for achieving constant current control.

According to another embodiment, an LED driving method for driving an LED circuit is provided. The LED driving method includes: driving a first color LED and a second color LED of the LED circuit by a first LED driving unit, the first LED driving unit generating an enable signal based on at least two color light duty cycle signals, the at least two color light duty cycle signals controlling an emitting cycle of the LED circuit; generating at least two color light current adjustment signals based the at least two color light duty cycle signals and at least two color light current level signals by the first LED driving unit; and adjusting current levels of the first and the second color LED of the LED circuit based on the enable signal and the at least two color light current adjustment signals by the first LED driving unit, for achieving constant current control.

According to an alternative embodiment, a LED display device is provided. The LED display device includes: an LED circuit; and an LED driving circuit, being coupled and driving the LED circuit. The LED driving circuit includes: a first LED driving unit, being coupled and driving a first color LED and a second color LED of the LED circuit. The first LED driving unit includes: a duty cycle circuit generating an enable signal based on at least two color light duty cycle signals, the at least two color light duty cycle signals controlling an emitting cycle of the LED circuit; a current control circuit, generating at least two color light current adjustment signals based the at least two color light duty cycle signals and at least two color light current level signals; and a constant current circuit, coupled to the duty cycle circuit and the current control circuit, the constant current circuit adjusting current levels of the first and the second color LED of the LED circuit based on the enable signal and the at least two color light current adjustment signals, for achieving constant current control.

Figure 1:
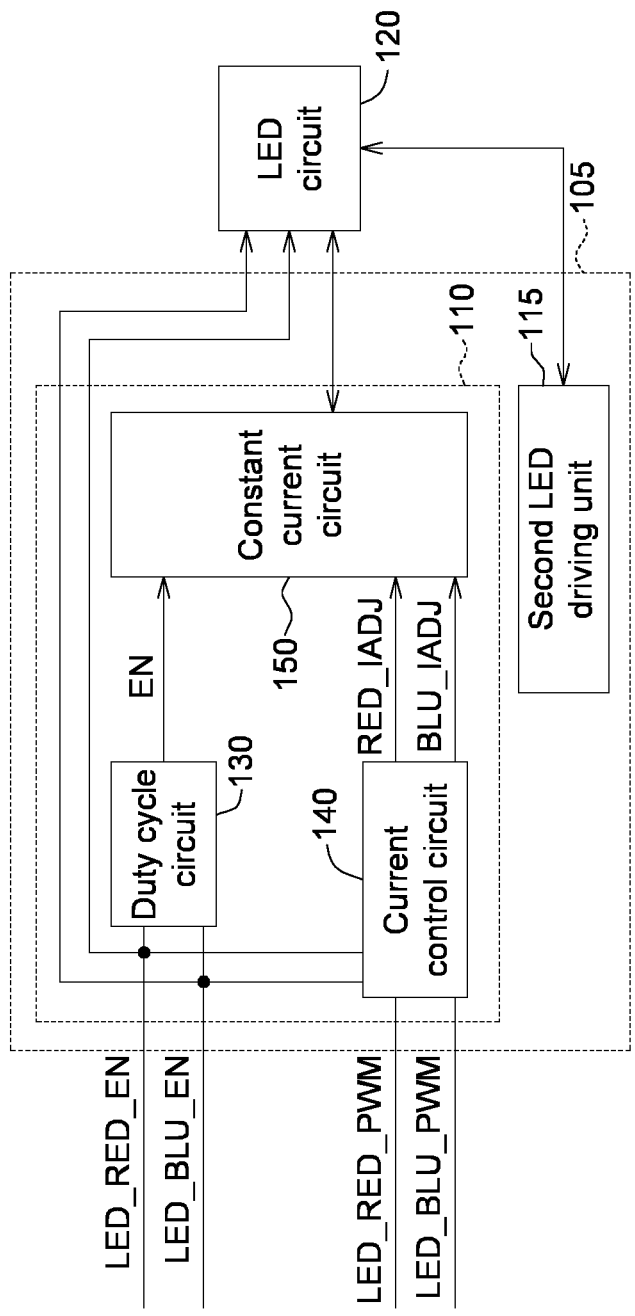
FIG. 1 shows a functional block diagram of an LED display device according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a functional block diagram of an LED display device according to one embodiment of the application. As shown in FIG. 1, the LED display device 100 according to one embodiment of the application includes: an LED driving circuit 105 and an LED circuit 120. The LED driving circuit 105 is coupled to the LED circuit 120 for driving the LED circuit 120.

The LED driving circuit 105 includes a first LED driving unit 110 and a second LED driving unit 115. The first LED driving unit 110 is coupled to the LED circuit 120 for driving a first color LED and a second color LED of the LED circuit 120. The second LED driving unit 115 is coupled to the LED circuit 120 for driving a third color LED of the LED circuit 120.

Here, a case that the first LED driving unit 110 is for driving red LEDs and blue LEDs and the second LED driving unit 115 is for driving green LEDs is taken as an example, but the application is not limited by this.

The first LED driving unit 110 includes a duty cycle circuit 130, a current control circuit 140 and a constant current circuit 150.

The duty cycle circuit 130 generates an enable signal EN to the constant current circuit 150 based on a first color light enable signal LED_RED_EN and a second color light enable signal LED_BLU_EN, wherein the first color light enable signal LED_RED_EN and the second color light enable signal LED_BLU_EN are also referred as a first color light duty cycle signal and a second color light duty cycle signal. The first color light enable signal LED_RED_EN and the second color light enable signal LED_BLU_EN are input into the LED circuit 120 and the current control circuit 140. The first color light enable signal LED_RED_EN and the second color light enable signal LED_BLU_EN control respective emitting cycles of the red LED and the blue LED, respectively.

The current control circuit 140 generates the first color light current adjustment signal RED_IADJ and the second color light current adjustment signal BLU_IADJ to the constant current circuit 150 based on the first color light enable signal LED_RED_EN, the second color light enable signal LED_BLU_EN, the first color light pulse width modulation (PWM) signal LED_RED_PWM and the second color light PWM signal LED_BLU_PWM. The first color light PWM signal LED_RED_PWM and the second color light PWM signal LED_BLU_PWM are also referred as the first color light current level signal and the second color light current level signal, for determining the current level of the color LED strings.

The constant current circuit 150 is coupled to the duty cycle circuit 130 and the current control circuit 140. The constant current circuit 150 adjusts current levels of the first and the second color LED of the LED circuit 120 based on the enable signal EN, the first color light current adjustment signal RED_IADJ and the second color light current adjustment signal BLU_IADJ, for achieving constant current control.

Figure 2A:
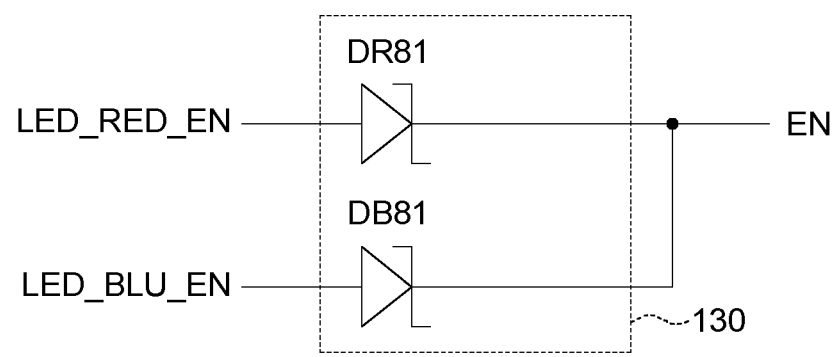
FIG. 2A shows a circuit diagram of a duty cycle circuit of the LED display device according to one embodiment of the application.

FIG. 2A shows a circuit diagram of a duty cycle circuit of the LED display device according to one embodiment of the application. As shown in FIG. 2A, the duty cycle circuit 130 includes diodes DR81 and DB81. The diode DR81 has an anode for receiving the first color light enable signal LED_RED_EN and a cathode for outputting the enable signal EN. The diode DB81 has an anode for receiving the second color light enable signal LED_BLU_EN and a cathode for outputting the enable signal EN. In normal operations, the diodes DR81 and DB81 are not allowed to be turned on at the same time.

Figure 2B:
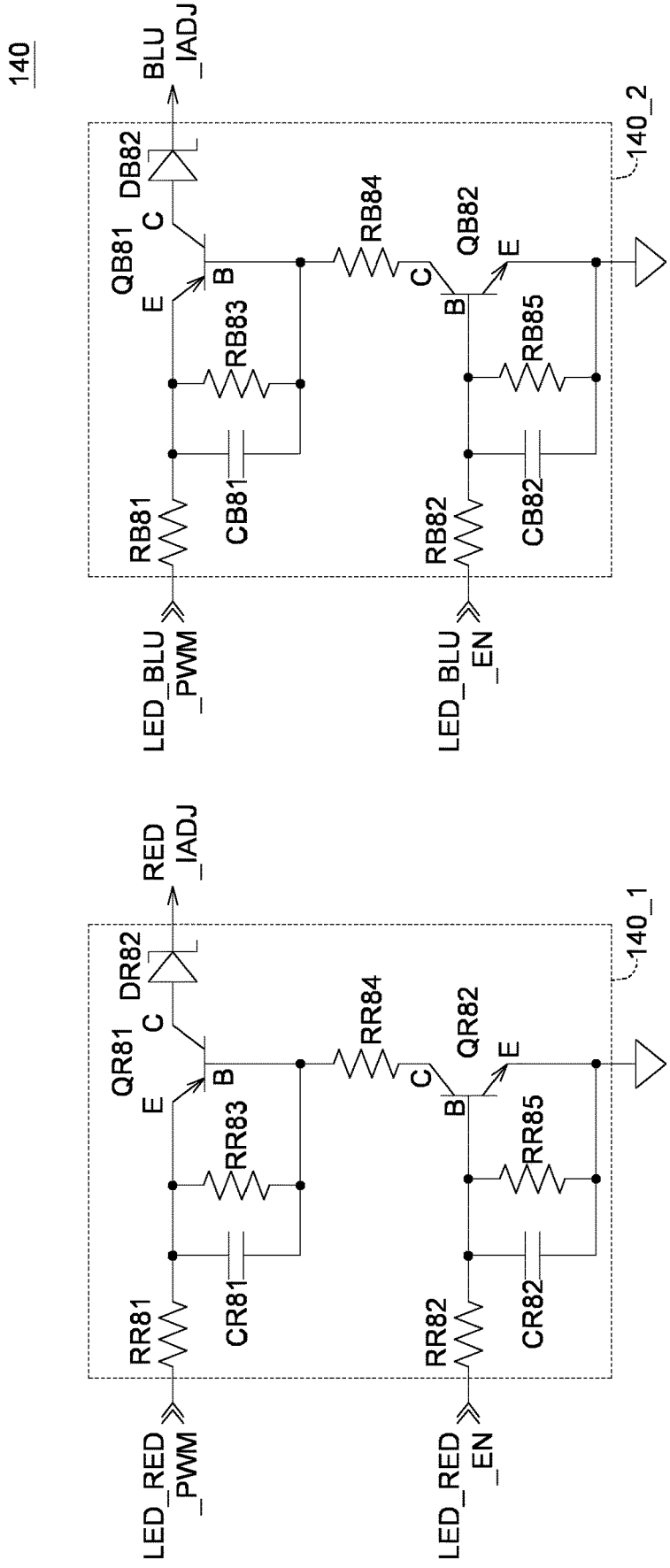
FIG. 2B shows a circuit diagram of a current control circuit of the LED display device according to one embodiment of the application.

FIG. 2B shows a circuit diagram of a current control circuit of the LED display device according to one embodiment of the application. The current control circuit 140 includes a first current control sub-circuit 140_1 and a second current control sub-circuit 140_2. The first current control sub-circuit 1401 generates the first color light current adjustment signal RED_IADJ based on the first color light enable signal LED_RED_EN and the first color light PWM signal LED_RED_PWM. The second current control sub-circuit 1402 generates the second color light current adjustment signal BLU_IADJ based on the second color light enable signal LED_BLU_EN and the second color light PWM signal LED_BLU_PWM.

The first current control sub-circuit 140_1 includes switches QR81 and QR82, a diode DR82, capacitors CR81 and CR82 and resistors RR81 to RR85. The switches QR81 and QR82 are for example but not limited by, bipolar junction transistors (BJTs).

The switch QR81 includes a first terminal (for example, the emitter terminal) receiving the first color light PWM signal LED_RED_PWM via the resistor RR81; a second terminal (for example, the collector terminal) coupled to the diode DR82; and a control terminal (for example, the base terminal) coupled to the switch QR82 via the resistor RR84.

The switch QR82 includes a first terminal (for example, the emitter terminal) coupled to GND; a second terminal (for example, the collector terminal) coupled to the switch QR81 via the resistor RR84; and a control terminal (for example, the base terminal) for receiving the first color light enable signal LED_RED_EN via the resistor RR82.

The diode DR82 includes a first terminal (for example the anode) coupled to the second terminal of the switch QR81; and a second terminal (for example the cathode) for outputting the first color light current adjustment signal RED_IADJ.

The capacitor CR81 and the resistor RR83 are parallel-connected between the first terminal (for example, the emitter terminal) and the second terminal (for example, the base terminal) of the switch QR81.

The capacitor CR82 and the resistor RR85 are parallel-connected between the first terminal (for example, the emitter terminal) and the second terminal (for example, the base terminal) of the switch QR82.

The resistor RR81 includes a first terminal for receiving the first color light PWM signal LED_RED_PWM; and a second terminal coupled to the first terminal (for example the emitter terminal) of the switch QR81.

The resistor RR82 includes a first terminal for receiving the first color light enable signal LED_RED_EN; and a second terminal coupled to the control terminal (for example the base terminal) of the switch QR82.

The resistor RR84 includes a first terminal coupled to the control terminal (for example the base terminal) of the switch QR81; and a second terminal coupled to the second terminal (for example the collector terminal) of the switch QR82.

The second current control sub-circuit 140_2 includes switches QB81 and QRB2, a diode DB82, capacitors CB81 and CB82 and resistors RB81 to RB85. The switches QBR81 and QB82 are for example but not limited by, bipolar junction transistors (BJTs).

The switch QB81 includes a first terminal (for example, the emitter terminal) receiving the second color light PWM signal LED_BLU_PWM via the resistor RB81; a second terminal (for example, the collector terminal) coupled to the diode DB82; and a control terminal (for example, the base terminal) coupled to the switch QB82 via the resistor RB84.

The switch QB82 includes a first terminal (for example, the emitter terminal) coupled to GND; a second terminal (for example, the collector terminal) coupled to the switch QB81 via the resistor RB84; and a control terminal (for example, the base terminal) for receiving the second color light enable signal LED_BLU_EN via the resistor RB82.

The diode DB82 includes a first terminal (for example the anode) coupled to the second terminal of the switch QB81; and a second terminal (for example the cathode) for outputting the second color light current adjustment signal BLU_IADJ.

The capacitor CB81 and the resistor RB83 are parallel-connected between the first terminal (for example, the emitter terminal) and the second terminal (for example, the base terminal) of the switch QB81.

The capacitor CB82 and the resistor RB85 are parallel-connected between the first terminal (for example, the emitter terminal) and the second terminal (for example, the base terminal) of the switch QB82.

The resistor RB81 includes a first terminal for receiving the second color light PWM signal LED_BLU_PWM; and a second terminal coupled to the first terminal (for example the emitter terminal) of the switch QB81.

The resistor RB82 includes a first terminal for receiving the second color light enable signal LED_BLU_EN; and a second terminal coupled to the control terminal (for example the base terminal) of the switch QB82.

The resistor RB84 includes a first terminal coupled to the control terminal (for example the base terminal) of the switch QB81; and a second terminal coupled to the second terminal (for example the collector terminal) of the switch QB82.

Figure 2C:
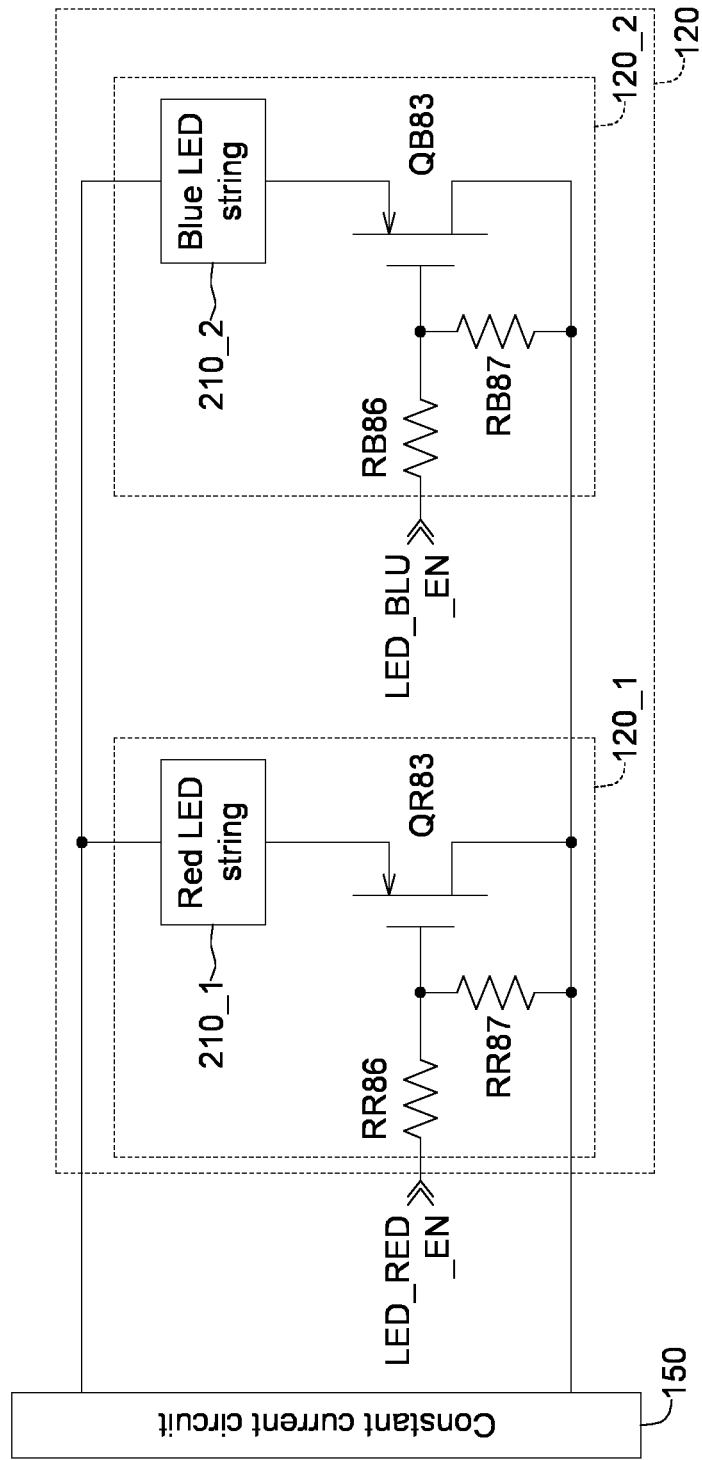
FIG. 2C shows a circuit diagram of the LED circuit of the LED display device according to one embodiment of the application.

FIG. 2C shows a circuit diagram of the LED circuit of the LED display device according to one embodiment of the application. The LED circuit 120 includes a first LED sub-circuit 120_1 and a second LED sub-circuit 120_2. Besides, the LED circuit 120 further includes a third LED sub-circuit (not shown). The third LED sub-circuit may have the same or similar circuit structure and operation as the first LED sub-circuit 120_1 and the second LED sub-circuit 1202, and thus the details thereof are omitted here.

The first LED sub-circuit 120_1 includes a switch QR83, a red LED string 210_1 and resistors RR86 and RR87.

The switch QR83 is for example but not limited by, Metal-Oxide-Semiconductor Field-Effect Transistor (MOS-FET). The switch QR83 includes a first terminal (for example the drain terminal) coupled to the red LED string 210_1; a second terminal (for example the source terminal) coupled to the constant current circuit 150; and a control terminal (for example the gate terminal) for receiving the first color light enable signal LED_RED_EN via the resistor RR86.

The red LED string 210_1 includes a first terminal (for example the anode) coupled to the constant current circuit 150; and a second terminal (for example the cathode) coupled to the first terminal of the switch QR83.

The resistor RR86 includes a first terminal for receiving the first color light enable signal LED_RED_EN; and a second terminal coupled to the control terminal of the switch QR83.

The resistor RR87 is coupled between the second terminal and the control terminal of the switch QR83.

The second LED sub-circuit 120_2 includes a switch QB83, a blue LED string 210_2 and resistors RB86 and RB87.

The switch QB83 is for example but not limited by, Metal-Oxide-Semiconductor Field-Effect Transistor (MOS-FET). The switch QB83 includes a first terminal (for example the drain terminal) coupled to the blue LED string 210_2; a second terminal (for example the source terminal) coupled to the constant current circuit 150; and a control terminal (for example the gate terminal) for receiving the second color light enable signal LED_BLU_EN via the resistor RB86.

The blue LED string 210_2 includes a first terminal (for example the anode) coupled to the constant current circuit 150; and a second terminal (for example the cathode) coupled to the first terminal of the switch QB83.

The resistor RB86 includes a first terminal for receiving the second color light enable signal LED_BLU_EN; and a second terminal coupled to the control terminal of the switch QB83.

The resistor RB87 is coupled between the second terminal and the control terminal of the switch QBR83.

LED driving details of one embodiment of the application are described. In LED driving, LEDs having different colors are sequentially driven. That is, LEDs having different colors are not allowed to be concurrently driven.

Driving the red LED is described. One skilled in the art would understand that the application is not limited by this.

When the red LED string 210_1 is to be turned on, the first color light enable signal LED_RED_EN is logic high to turn on the switch QR82. Because the switch QR82 is turned on, the control voltage of the switch QR81 is pulled low to turn on the switch QR81. When the switch QR81 is turned on, via integration on the capacitor CR81, the first color light PWM signal LED_RED_PWM passes through the switch QR81 and the diode DR82 to become the first color light current adjustment signal RED_IADJ. The first color light current adjustment signal RED_IADJ inputs into the constant current circuit 150 to adjust currents flowing through the red LED string 210_1. Further, in the first LED sub-circuit 120_1, in response to that the first color light enable signal LED_RED_EN is logic high, the switch QR83 is turned on and thus the red LED string 210_1 is turned on for emitting light.

Similarly, when the blue LED string 2102 is to be turned on, the second color light enable signal LED_BLU_EN is logic high to turn on the switch QB82. Because the switch QB82 is turned on, the control voltage of the switch QB81 is pulled low to turn on the switch QB81. When the switch QRB1 is turned on, via integration on the capacitor CB81, the second color light PWM signal LED_BLU_PWM passes through the switch QB81 and the diode DB82 to become the second color light current adjustment signal BLU_IADJ. The second color light current adjustment signal BLU_IADJ inputs into the constant current circuit 150 to adjust currents flowing through the blue LED string 210_2. Further, in the second LED sub-circuit 120_2, in response to that the second color light enable signal LED_BLU_EN is logic high, the switch QB83 is turned on and thus the blue LED string 210_2 is turned on for emitting light.

Similarly, FIG. 2A to FIG. 2C are also applicable to turning on and emitting the green LED string.

Figure 3:
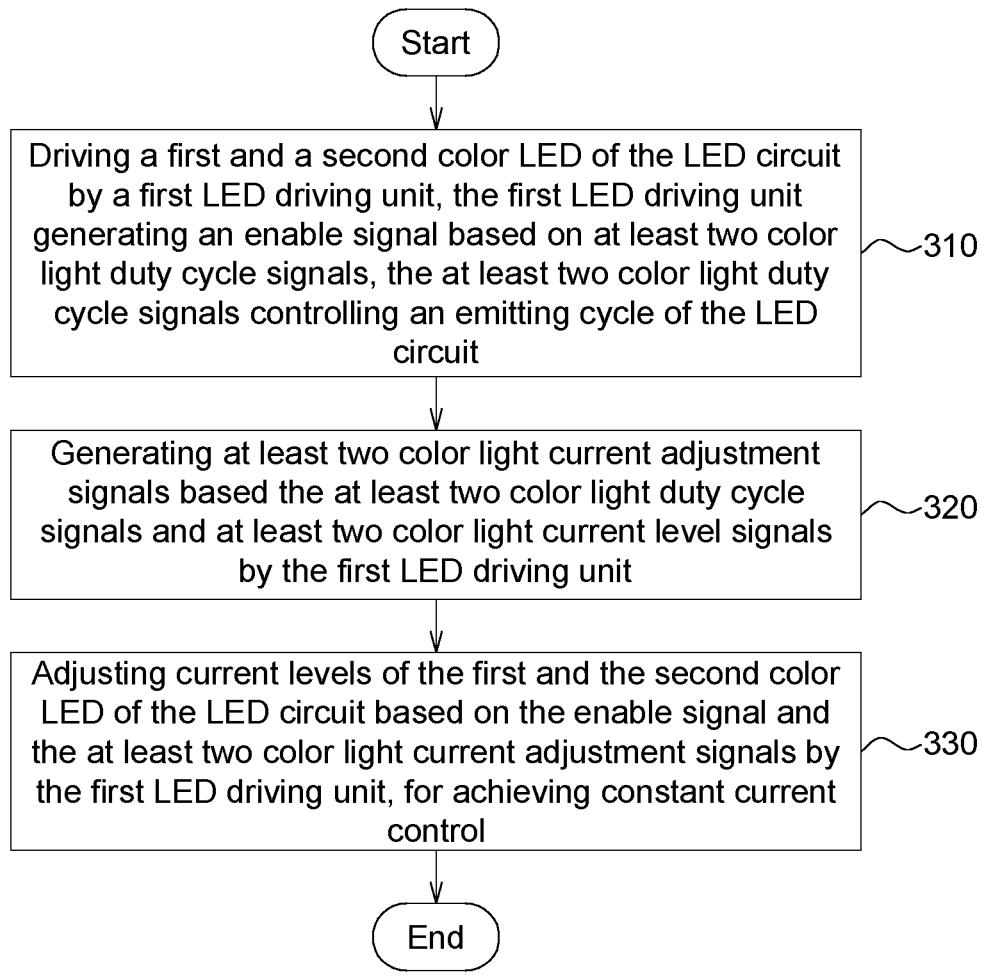
FIG. 3 shows an LED driving method in an LED display device according to one embodiment of the application.

FIG. 3 shows an LED driving method in an LED display device according to one embodiment of the application. The driving method includes: (310) driving a first and a second color LED of the LED circuit by a first LED driving unit, the first LED driving unit generating an enable signal based on at least two color light duty cycle signals, the at least two color light duty cycle signals controlling an emitting cycle of the LED circuit; (320) generating at least two color light current adjustment signals based the at least two color light duty cycle signals and at least two color light current level signals by the first LED driving unit; and (330) adjusting current levels of the first and the second color LED of the LED circuit based on the enable signal and the at least two color light current adjustment signals by the first LED driving unit, for achieving constant current control.

As described above, in one embodiment of the application, by driving at least two kinds of color LEDs by the first LED driving unit of the LED driving circuit, the number of the LED driving units are reduced and thus the circuit area of the LED driving circuit is also reduced. By so, the LED driving circuit occupies less space inside the LED display device and the circuit cost of the LED display device is also reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An LED driving circuit being coupled and driving an LED circuit, the LED driving circuit including:
   a first LED driving unit, being coupled and driving a first color LED and a second color LED of the LED circuit, the first LED driving unit including:
      a duty cycle circuit generating an enable signal based on at least two color light duty cycle signals, the at least two color light duty cycle signals controlling an emitting cycle of the LED circuit;
      a current control circuit, generating at least two color light current adjustment signals based the at least two color light duty cycle signals and at least two color light current level signals; and
      a constant current circuit, coupled to the duty cycle circuit and the current control circuit, the constant current circuit adjusting current levels of the first and the second color LED of the LED circuit based on the enable signal and the at least two color light current adjustment signals, for achieving constant current control.

2. The LED driving circuit according to claim 1, wherein the duty cycle circuit includes a first diode and a second diode, the first diode and the second diode generate the enable signal based on the at least two color light duty cycle signals.

3. The LED driving circuit according to claim 1, wherein the current control circuit includes at least two current control sub-circuits, generating the at least two color light current adjustment signals based the at least two color light duty cycle signals and the at least two color light current level signals.

4. The LED driving circuit according to claim 3, wherein each of the current control sub-circuits includes: a first switch and a second switch, and a third diode,
   the first switch includes a first terminal for receiving one of the at least two color light current level signals; a second terminal coupled to the third diode; and a control terminal coupled to the second switch;
   the second switch includes a first terminal coupled to a ground terminal; a second terminal coupled to the first switch; and a control terminal for receiving one of the at least two color light duty cycle signals; and
   the third diode includes a first terminal coupled to the first switch and a second terminal for outputting one of the at least two color light current adjustment signals.

5. The LED driving circuit according to claim 3, wherein the first switch and the second switch are both bipolar junction transistors.

6. The LED driving circuit according to claim 4, wherein when the first or the second color LED of the LED circuit is to be turned on, one of the at least two color light duty cycle signals is logic high to turn on the second switch; the first switch is turned on due to turning on of the second switch; when the first switch is turned on, one of the at least two color light current level signals passed through the first switch and the third diode to become one of the at least two color light current adjustment signals; the one of the at least two color light current adjustment signals inputs into the constant current circuit to adjust currents flowing through the first or the second color LED of the LED circuit; and
   in the LED circuit, in response to that the one of the at least two color light duty cycle signals is logic high, the first or the second color LED of the LED circuit is turned on for emitting light.

7. The LED driving circuit according to claim 1, wherein the first color LED and the second color LED of the LED circuit are at least two of a red LED, a green LED and a blue LED.

8. An LED driving method for driving an LED circuit, the LED driving method including:
   driving a first color LED and a second color LED of the LED circuit by a first LED driving unit, the first LED driving unit generating an enable signal based on at least two color light duty cycle signals, the at least two color light duty cycle signals controlling an emitting cycle of the LED circuit;
   generating at least two color light current adjustment signals based the at least two color light duty cycle signals and at least two color light current level signals by the first LED driving unit; and
   adjusting current levels of the first and the second color LED of the LED circuit based on the enable signal and the at least two color light current adjustment signals by the first LED driving unit, for achieving constant current control.

9. The LED driving method according to claim 8, wherein the step of generating the enable signal includes: generating the enable signal based on the at least two color light duty cycle signals by a first diode and a second diode.

10. The LED driving method according to claim 8, wherein the step of generating the at least two color light current adjustment signals includes:
    generating the at least two color light current adjustment signals based the at least two color light duty cycle signals and the at least two color light current level signals by at least two current control sub-circuits.

11. The LED driving method according to claim 10, wherein each of the current control sub-circuits includes: a first switch and a second switch, and a third diode,
    the first switch includes a first terminal for receiving one of the at least two color light current level signals; a second terminal coupled to the third diode; and a control terminal coupled to the second switch;
    the second switch includes a first terminal coupled to a ground terminal; a second terminal coupled to the first switch; and a control terminal for receiving one of the at least two color light duty cycle signals; and
    the third diode includes a first terminal coupled to the first switch and a second terminal for outputting one of the at least two color light current adjustment signals.

12. The LED driving method according to claim 10, wherein the first switch and the second switch are both bipolar junction transistors.

13. The LED driving method according to claim 11, wherein
when the first or the second color LED of the LED circuit is to be turned on, one of the at least two color light duty cycle signals is logic high to turn on the second switch; the first switch is turned on due to turning on of the second switch; when the first switch is turned on, one of the at least two color light current level signals passed through the first switch and the third diode to become one of the at least two color light current adjustment signals; the one of the at least two color light current adjustment signals inputs into the constant current circuit to adjust currents flowing through the first or the second color LED of the LED circuit; and
in the LED circuit, in response to that the one of the at least two color light duty cycle signals is logic high, the first or the second color LED of the LED circuit is turned on for emitting light.

14. The LED driving method according to claim 8, wherein the first color LED and the second color LED of the LED circuit are at least two of a red LED, a green LED and a blue LED.

15. An LED display device including:
an LED circuit; and
an LED driving circuit, being coupled and driving the LED circuit, the LED driving circuit including:
a first LED driving unit, being coupled and driving a first color LED and a second color LED of the LED circuit, the first LED driving unit including: a duty cycle circuit generating an enable signal based on at least two color light duty cycle signals, the at least two color light duty cycle signals controlling an emitting cycle of the LED circuit; a current control circuit, generating at least two color light current adjustment signals based the at least two color light duty cycle signals and at least two color light current level signals; and a constant current circuit, coupled to the duty cycle circuit and the current control circuit, the constant current circuit adjusting current levels of the first and the second color LED of the LED circuit based on the enable signal and the at least two color light current adjustment signals, for achieving constant current control.

16. The LED display device according to claim 15, wherein the current control circuit includes at least two current control sub-circuits, generating the at least two color light current adjustment signals based the at least two color light duty cycle signals and the at least two color light current level signals.

17. The LED display device according to claim 16, wherein each of the current control sub-circuits includes: a first switch and a second switch, and a third diode,
the first switch includes a first terminal for receiving one of the at least two color light current level signals; a second terminal coupled to the third diode; and a control terminal coupled to the second switch;
the second switch includes a first terminal coupled to a ground terminal; a second terminal coupled to the first switch; and a control terminal for receiving one of the at least two color light duty cycle signals; and
the third diode includes a first terminal coupled to the first switch and a second terminal for outputting one of the at least two color light current adjustment signals.

18. The LED display device according to claim 17, wherein the first switch and the second switch are both bipolar junction transistors.

19. The LED display device according to claim 17, wherein
when the first or the second color LED of the LED circuit is to be turned on, one of the at least two color light duty cycle signals is logic high to turn on the second switch; the first switch is turned on due to turning on of the second switch; when the first switch is turned on, one of the at least two color light current level signals passed through the first switch and the third diode to become one of the at least two color light current adjustment signals; the one of the at least two color light current adjustment signals inputs into the constant current circuit to adjust currents flowing through the first or the second color LED of the LED circuit; and
in the LED circuit, in response to that the one of the at least two color light duty cycle signals is logic high, the first or the second color LED of the LED circuit is turned on for emitting light.

20. The LED display device according to claim 15, wherein the first color LED and the second color LED of the LED circuit are at least two of a red LED, a green LED and a blue LED.

* * * * *